United States Patent
Kleber et al.

(10) Patent No.: US 9,219,399 B2
(45) Date of Patent: Dec. 22, 2015

(54) METHOD FOR FABRICATING ROTOR FOR INDUCTION MOTOR

(71) Applicant: GM Global Technology Operations, Detroit, MI (US)

(72) Inventors: Richard M. Kleber, Clarkston, MI (US); Michael D. Hanna, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 490 days.

(21) Appl. No.: 13/662,301

(22) Filed: Oct. 26, 2012

(65) Prior Publication Data

US 2013/0049518 A1    Feb. 28, 2013

Related U.S. Application Data

(63) Continuation-in-part of application No. 13/037,040, filed on Feb. 28, 2011, now Pat. No. 8,910,371.

(51) Int. Cl.
    *H02K 15/12*    (2006.01)
    *H02K 15/00*    (2006.01)
    *H02K 17/16*    (2006.01)

(52) U.S. Cl.
    CPC .......... *H02K 15/0012* (2013.01); *H02K 17/165* (2013.01); *Y10T 29/49012* (2015.01)

(58) Field of Classification Search
    CPC ............................... H02K 15/12; H02K 15/09
    USPC ........ 310/211, 43, 45, 125, 124; 29/598, 608, 29/609, 596, 592.1
    See application file for complete search history.

(56) References Cited

U.S. PATENT DOCUMENTS

| | | | |
|---|---|---|---|
| 2005/0134137 A1* | 6/2005 | Sweo | 310/211 |
| 2011/0185850 A1* | 8/2011 | Kientzler et al. | 75/309 |
| 2011/0316380 A1* | 12/2011 | Buttner et al. | 310/211 |

FOREIGN PATENT DOCUMENTS

| | | |
|---|---|---|
| DE | 10113962 A1 * | 10/2002 |
| DE | 102009008440 B3 * | 12/2010 |

OTHER PUBLICATIONS

Machine translation of DE 102009008440 B3 (Dec. 2010).*
Machine translation of DE 10113962 A1 (Oct. 2002).*

* cited by examiner

*Primary Examiner* — Michael Andrews
(74) *Attorney, Agent, or Firm* — Dierker & Associates, P.C.

(57) ABSTRACT

A method for fabricating a rotor for an induction motor includes disposing a first flux material on a plurality of first exposed ends of a respective plurality of conductor bars of a rotor core. A second flux material is disposed on a first end face of the rotor core. A first portion of a conductive material is cast over the plurality of first exposed ends to form a first shorting end ring to electrically and mechanically connect the plurality of conductor bars.

18 Claims, 2 Drawing Sheets

METHOD FOR FABRICATING ROTOR FOR INDUCTION MOTOR

CROSS-REFERENCE TO RELATED APPLICATIONS

This application is a continuation-in-part of co-pending U.S. patent application Ser. No. 13/037,040, filed Feb. 28, 2011, which is incorporated by reference herein in its entirety.

TECHNICAL FIELD

The present disclosure generally relates to electrically powered motors.

BACKGROUND

Some electric motors convert electrical energy to mechanical energy and convert mechanical energy to electrical energy. Electric motors may be connected to an energy storage device thereby enabling the transfer of energy therebetween. AC induction motors are a particular type of electric motor that uses induced current flow to cause portions of the motor's rotor to become magnetized during the operation of the motor. AC induction motors utilize single-phase or multiphase power to produce a rotating magnetic field through a series of stators to turn a rotor. The rotating magnetic field induces electrical current through a plurality of conductive bars in the rotor. The electrical current in the conductive bars reacts with the magnetic field produced by the stators to create torque at the rotor for performing work.

SUMMARY

A method for fabricating a rotor for an induction motor includes disposing a first flux material on a plurality of first exposed ends of a respective plurality of conductor bars of a rotor core. A second flux material is disposed on a first end face of the rotor core. A first portion of a conductive material is cast over the plurality of first exposed ends to form a first shorting end ring to electrically and mechanically connect the plurality of conductor bars.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
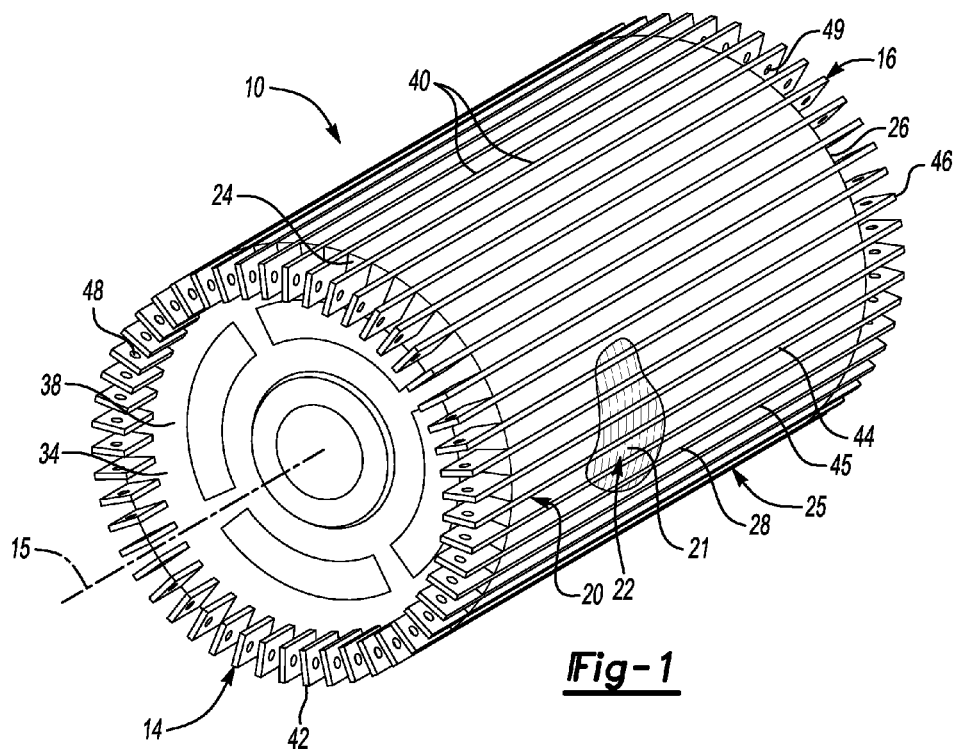
FIG. 1 depicts an isometric view of a partially assembled rotor assembly for an induction motor, in accordance with an example of the present disclosure.

Examples of the method and device disclosed herein relate to a rotor for an AC (alternating current) induction motor.

The stators of an AC induction motor may include a plurality of paired poles that are created from a series of windings. The stators may be distributed around a rotor. Examples of the rotor may include a laminated structure with conductor bars connected through shorting end rings. A squirrel-cage rotor is a particular type of rotor. The squirrel-cage rotor has a generally cylindrical shape that includes a plurality of conductor bars along a length of a laminated stack at an outer perimeter. In some induction motors, the plurality of conductive bars may be made of copper due to the thermal and conductive properties of copper. Other materials, such as aluminum, may be used for the conductor bars. The conductor bars in the squirrel-cage rotor are connected at their ends by two shorting end rings. The rotor includes a series of electrically conductive steel laminations also called a laminate stack. The laminate stack is capped at both ends by the shorting end rings. The shorting end rings hold the conductor bars and the laminate stack together. The laminate stack is the primary magnetic flux-carrying member while the conductor bars carry electrical current to generate a magnetic field and ultimately to generate rotation of the rotor.

Some rotor fabrication methods include assembling the laminated steel stack with conductor bars on an outer periphery of the rotor and shorting end rings on the ends thereof. Rotor fabrication may include placing the laminated steel stack into a casting mold. Molten material may be introduced into open spaces formed in the rotor and open spaces between the die cast mold and the laminated steel stack to form the shorting end rings and conductor bars. Oxide inclusions and voids may be formed in the conductor bars and shorting end rings during the process of filling the mold with molten material and during solidification. The molten material may cool and partially solidify during turbulent flow of the molten material into the plurality of conductor bar grooves due in part to exposure to surface areas of the conductor bar grooves. The molten material may begin to solidify before the mold is filled. Partially solidified material may impede molten material flow and cause voids, oxide inclusions, and other discontinuities in the conductor bars and the shorting end rings.

Some rotors for induction motors are made by high pressure die casting aluminum; creating both the conductor bars and the shorting end rings from aluminum in the same operation. Other rotors for induction motors are made by inserting individual copper conductor bars, then brazing each end of each conductor bar to the shorting end rings. The performance of the rotors with die cast aluminum conductor bars may be well below that of rotors assembled with copper rotors, but material and manufacturing cost savings may be realizable if the performance is acceptable.

Power density output from an electric induction motor correlates to quality of the conductor bars and mass bulk density of the individual conductor bars. In some conductor bars and shorting end rings that are cast-in-place, voids may be formed in the conductor bars and the shorting end rings during fabrication. Such voids may reduce power density output of some electric induction motors. The presence of oxide occlusions and cracks due to hot tearing may reduce the electric conductivity of the conductor bars and shorting end rings, thereby reducing the power density output of the motor.

Rather than pressure die casting aluminum conductor bars and shorting end rings, copper may be used. However, die casting copper may have drawbacks, since the temperature must be relatively high, and die life is relatively short because of reaction with copper.

The use of copper material for conductor bars may increase power density and heat transfer characteristics of an induction motor as compared to an induction motor using aluminum conductor bars. Some cast aluminum shorting end rings may be cast more easily than cast copper shorting end rings while providing acceptable heat transfer properties. Copper material may be used to form conductor bars and shorting end rings, however, such use of copper may increase manufacturing process times and complexity as compared to aluminum conductor bars and shorting end rings. Manufacturing processes may include casting both the conductor bars and shorting end rings from the same material and welding or brazing conductor bars to shorting end rings.

Examples of the present disclosure create a high performance rotor with copper conductor bars, but solve issues of shorting end ring brazing by creating a cast-in-place aluminum shorting end ring. Components of the rotor may be coated with a bonding agent to improve performance of a copper intensive induction rotor with cast-in-place aluminum shorting end rings.

A bonding agent may be applied as a surface treatment to the each of the conductor bars for creating a more robust metallurgical bond between the conductor bars and shorting end rings. In an example disclosed herein, the bonding agent may be a flux material applied to the conductor bars. Without being bound to any theory, it is believed that the flux material removes oxides that can form on the conductor bars and during the rapid cooling of the molten material thereby creating a better metallurgical bond between the conductor bars and the shorting end rings. In another example of the present disclosure, the bonding agent may be an intermediate element, e.g., tin, applied to conductor bars. Examples of intermediate elements may have low melting points and chemical compatibility with the materials of the conductor bars and the shorting end rings. The bonding agent may be applied to the entire conductor bar or only the first and second exposed ends. By applying a bonding agent to the conductor bars prior to casting the shorting end rings, the power density output of the induction motor may be maintained or improved.

Referring now to FIG. 1, an isometric view of an induction rotor assembly 10 for an induction motor is illustrated. The induction motor may be any induction motor, including an induction motor for use in a powertrain system for a motor vehicle (not shown). The rotor assembly 10 is fixedly attached to a rotor shaft (not shown) centered upon an axis of rotation 15 using any suitable means, e.g., shrink fit and lock-and-key torque fitting. The rotor assembly 10 may be assembled onto the rotor shaft subsequent to assembly of the rotor. The rotor assembly 10 and the rotor shaft share the same axis of rotation 15.

The rotor assembly 10 includes a first end 14 and a second end 16. The rotor assembly 10 is to be assembled into and rotate within a stator (not shown) of an induction motor.

Examples of the rotor assembly 10 disclosed herein include a rotor core 20. An assembled cylindrically-shaped steel laminate stack 21 may be included in the rotor core 20. Further, the rotor core 20 may include a plurality of longitudinally-oriented conductor bars 40. The rotor core 20 includes first and second end faces 24, 26, and the conductor bars 40 are peripherally disposed through the rotor core 20 with first and second exposed ends 42, 46 extending beyond the respective first and second end faces 24, 26 of the rotor core 20. The first end face 24 of the rotor core 20 corresponds to the first end 14 of the rotor assembly 10, and the second end face 26 of the rotor core 20 corresponds to the second end 16 of the rotor assembly 10.

The rotor core 20 may be fabricated from a plurality of thin laminate sheets 21 formed from ferric material. In an example, a thickness of the laminated sheets 21 may range from about 0.25 mm (millimeter) (0.010 inch) to about 0.51 mm (0.020 inch). In an example, the laminate sheets 21 are about 0.33 mm (0.013 inch) thick. It is to be understood that the thickness is measured parallel to the axis of rotation 15. The laminate sheets 21 may be stamped using a fine blanking process and may be electrically insulated to minimize eddy currents. Each laminate sheet 21 is a flat annular-shaped device and includes a plurality of radially-oriented slots formed near an outer periphery thereof. When the laminate sheets 21 are assembled into the rotor core 20, the radially-oriented slots are aligned to form grooves 28 that may be longitudinally-oriented parallel with the axis of rotation 15 of the rotor core 20 and are at an outer periphery 25 of the rotor core 20. Alternatively, the grooves 28 may include an acute angle in relation to the axis of rotation 15. The grooves 28 and the conductor bars 40 therein will be discussed as longitudinally-oriented; however, this orientation is understood to include either an alignment that is parallel to the axis of rotation 15 or an acute angle from parallel with respect to the axis of rotation 15.

The grooves 28 may have any suitable cross-sectional shape. In an example of the present disclosure, the grooves 28 have a substantially rectangular-shaped cross-section. The longitudinally-oriented grooves 28 are substantially periodically spaced around the periphery 25, i.e., evenly or varying the spacing in an uneven manner. Conductor bars 40 are each carried within one of the grooves 28. The laminate sheets 22 may be assembled onto the axis of rotation 15 in a laminated fashion using any suitable fabricating method.

The conductor bars 40 may be fabricated from copper-based materials and inserted into each of the grooves 28 by any suitable process, including, e.g., insertion of a solid bar or molding. Alternatively, the conductor bars 40 may be fabricated from aluminum-based or similar electrically conductive materials. Examples of the conductor bars 40 disclosed herein include features at each of a first exposed end 42 and second exposed end 46 of the conductor bars 40. It will be appreciated that the conductor bars 40 may include the features described on the first exposed end 42 only, with different features according to another method utilized at the second exposed end 46. Each conductor bar 40 includes the first exposed end 42, a central portion 44, and the second exposed end 46, and each has a peripheral edge 45. The first exposed end 42 projects beyond the first end face 24 of the rotor core 20 and may include a first aperture 48 defined in the first exposed end 42. The second exposed end 46 projects beyond the second end face 26 of the rotor core 20 and may include a second aperture 50 defined in the second exposed end 46. Each of the apertures 48, 50 may be a circular shaped opening in an example of the present disclosure, although other shapes, e.g., rectangular or star pattern, may be utilized. The central portion 44 is to be secured within the grooves 28 formed in the rotor core 20. The peripheral edge 45 of each conductor bar 40 projects through the grooves 28 on the periphery 25 along the central portion 44, and further projects along the first and second exposed ends 42 and 46. The conductor bars 40 may have a parallel relation with the axis of rotation of the rotor shaft or may form an acute angle with the axis of rotation 15 of the rotor shaft.

Figure 2:
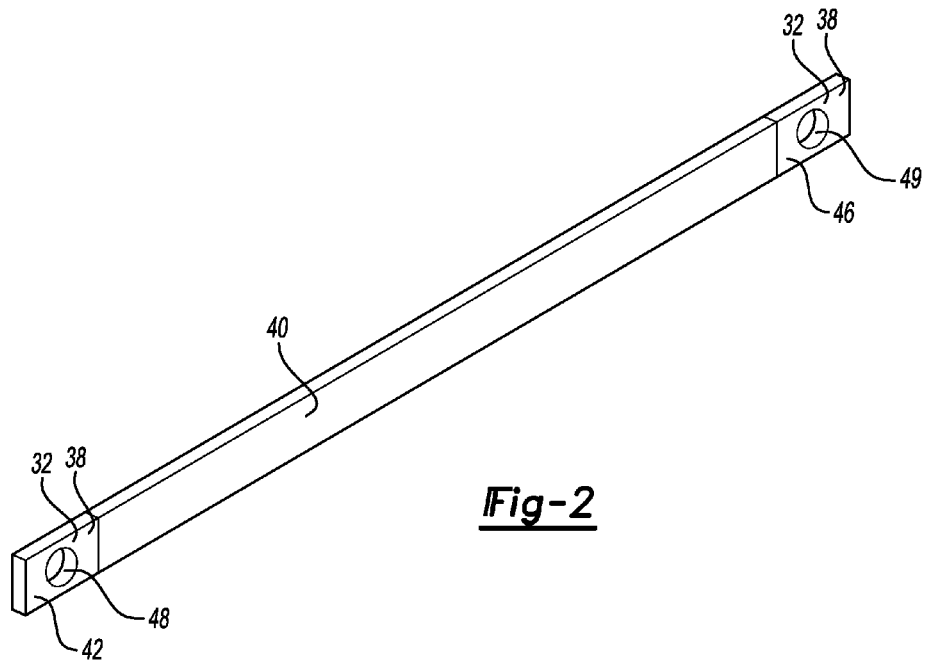
FIG. 2 depicts an isometric view of a conductor bar in accordance with an example of the present disclosure.

FIG. 2 depicts a singular conductor bar 40. The first exposed end 42 of the conductor bar 40 is depicted having a coating of a first flux material 32 to a coated length slightly greater than a length of the first exposed end 42 of the conductor bar 40 after the conductor bar is inserted into the rotor 20. The second exposed end 46 of the conductor bar 40 is similarly coated with the first flux material 32. The first flux material 32 may be applied to each conductor bar 40 individually prior to insertion into a corresponding groove 28 in the laminate stack 22 (see FIG. 1).

Referring to FIGS. 1 and 2 together, the first end face 24 and the second end face 26 of the steel laminate stack 22 may be coated with a second flux material 34 that would be suitable for the application of molten aluminum to the steel surface of the laminate stack 22.

In examples of the present disclosure, the first flux material 32 and the second flux material 34 may be substantially the same flux material 38. In examples in which the same flux material 38 is used to coat the first and second exposed ends 42, 46 and the first and second end faces 24, 26, a sub-assembly having the conductor bars 40 inserted into the laminate stack 22 may be assembled before the same flux material 38 is applied to the sub-assembly.

The sub-assembly of the conductor bars 40 and laminate stack 22 may be flux coated by dipping the sub-assembly into a reservoir of the same flux material 38 in a liquid or charged powder form, or by subjecting the sub-assembly to a spray or other surface deposition application. For example, if the same flux material 38 is used on the first exposed end 42 and the second exposed end 46 of each conductor bar 40 and the first end face 24 and second end face 26 of the laminate stack 22, the assembly may be coated after the conductor bars 40 are inserted in the laminate stack 22.

Conversely, if the first flux material 32 is different from the second flux material 34, the coating of the first exposed ends 42 and the second exposed ends 46 may be performed in a distinct operation from the coating of the first and second end faces 24, 26 of the rotor core 20. As such, the conductor bars 40 may be pre-coated with the first flux material 32 prior to inserting the conductor bars 40 into the laminate stack 22.

Figure 3:
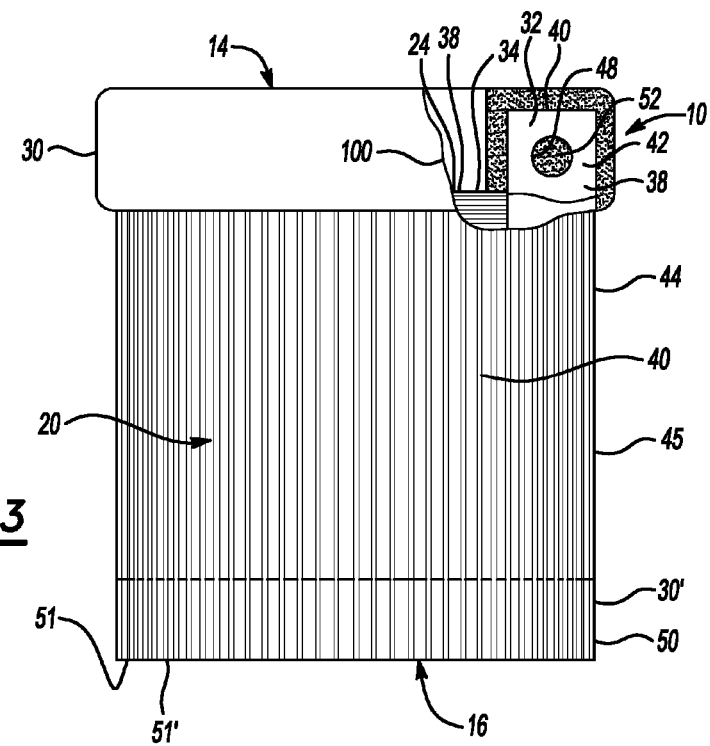
FIG. 3 illustrates a rotor assembly for an induction motor with a rough casting and partial section view of shorting end ring on the first end and a finished machined casting of shorting end ring on the second end, in accordance with an example of the present disclosure.

FIG. 3 illustrates a partially cut away side view of a rotor assembly 10 for an induction motor with a rough casting and partial section view of shorting end ring 30 on the first end 14 and a finished machined casting of shorting end ring 30' on the second end 16. Each of the annular-shaped shorting end rings 30, 30' may be cast in place from aluminum-based materials. Alternatively, the shorting end rings 30, 30' may be cast from copper-based or other electrically conductive materials. Each shorting end ring 30, 30' is cast in place at an end of the laminate stack 22 by inserting the sub-assembly of the conductor bars 40 and laminate stack 22 into a die or mold and introducing a portion of molten material to the first and second ends 14, 16 through any casting process. Both the first and second ends 14, 16 may undergo the same type of over-casting process. It is to be understood that the process discussed herein in terms of the first end 14 may be applied to the second end 16.

In an example of the present disclosure, a first portion of the conductive material, which may be in a molten state when introduced into the mold/die cavity, is cast over the plurality of first exposed ends 42 to form a first shorting end ring 30 to electrically and mechanically connect the plurality of conductor bars 40. A second portion of the conductive material, which may also be in a molten state when introduced to the mold/die cavity, may be cast over the plurality of second exposed ends 46 to form a second shorting end ring 30' to electrically and mechanically connect the plurality of conductor bars 40.

In examples of the present disclosure, the portion of molten material that ultimately solidifies to form the shorting end ring engulfs the respective flux coated first and second exposed ends 42, 46 of the copper conductor bars 40 and flows through the apertures 48, 50. The cutaway portion 100 of the FIG. 3 shows the first exposed end 42 of one particular conductor bar 40 and the aperture 48 defined in the first exposed end 42. FIG. 3 shows the penetration of the portion of molten material through the aperture 48. When the portion of molten material solidifies, it forms the shorting end ring 30 with the conductor bar 40 locked into the solidified structure of the shorting end ring 30. The portion of molten material comes into direct contact with the flux coated first end face 24 of the rotor core 20. The flow and solidification interlocks the shorting end ring 30, and conductor bars 40 into a singular assembly. When the second end 16 of the rotor assembly 10 undergoes a similar casting process creating a shorting end ring 30', the laminate stack 22 is also interlocked with the shorting end rings 30, 30' and the conductor bars 40. FIG. 3 shows shorting end ring 30' after it has been machined to a final state with a finished outside diameter 50 and end surface 51. FIG. 3 depicts shorting end ring 30 in an "as cast" state.

In an example of the present disclosure, components of the rotor assembly 10 may be preheated, for example in an industrial oven or with induction heating apparatus, prior to casting. Preheating the components may promote casting integrity by substantially reducing quenching of the molten material as the molten material contacts the exposed ends 42, 46 and laminate stack 22. The molten material creates a metallurgical bond with the conductor bars 40 and cools to form the shorting end ring 30, 30' as a monolithic casting. The shorting end ring 30, 30' includes a portion that extends through each of the conductor bars 40 at the apertures 48, 49 to create a mechanical interlock 52 at the aperture 48, 49. The mechanical interlock 52 cross section can be adjusted for shear strength based on the size of the aperture 48, 49, i.e., shear strength of the mechanical interlock 52 may be increased by increasing the amount of material in the aperture 48, 49.

The mechanical interlock 52 may also be sized for directional strength corresponding to the direction of high stress, i.e., the aperture 48, 49 may be elongated in the direction with the highest stress under operating conditions. Additionally, the aperture 48, 49 may be optimized for electrical conductivity between the conductor bars 40 and the shorting end ring 30, 30', i.e., the aperture 48, 49 may have a shape, e.g., star pattern, that increases surface area contact between the conductor bar 40 and the shorting end ring 30, 30'. Although the aperture 48, 49 is discussed as being present on each of the conductor bars 40, in an example of the present disclosure, a fraction of the plurality of conductor bars 40 may include the aperture 48, 49, e.g., one-half and one-third of the conductor bars 40 may have the aperture 48, 49.

Further, in examples of the present disclosure, an aperture 48 or 49 may be defined in at least one of the first exposed end 42 or the second exposed end 46. In an example, the first exposed end 42 may define aperture 48, and the second exposed end 46 may not define an aperture. In another example, the first exposed end 42 may not have an aperture defined therein, and the second exposed end 46 may define an aperture 49. In yet a further example, an aperture 48 may be defined in the first exposed end 42, and an aperture 49 may be defined in the second exposed end 46.

In examples of the present disclosure, the rotor assembly 10 may be removed from the die and machined to remove over-cast material that may be present as a result of the casting process. The shorting end ring 30' may have the over-cast material removed and may expose the peripheral edge 45 of the conductor bars 40 as depicted by shorting end ring 30' in FIG. 3. A net-zero die cast process, i.e. a process that does not require machining after casting, may also be utilized. As a result, shorting end rings 30 and 30' include an axis of rotation 15 coincident to rotor assembly 10, the rotor shaft (not shown), and rotor core 20 (see FIG. 1).

Figure 4:
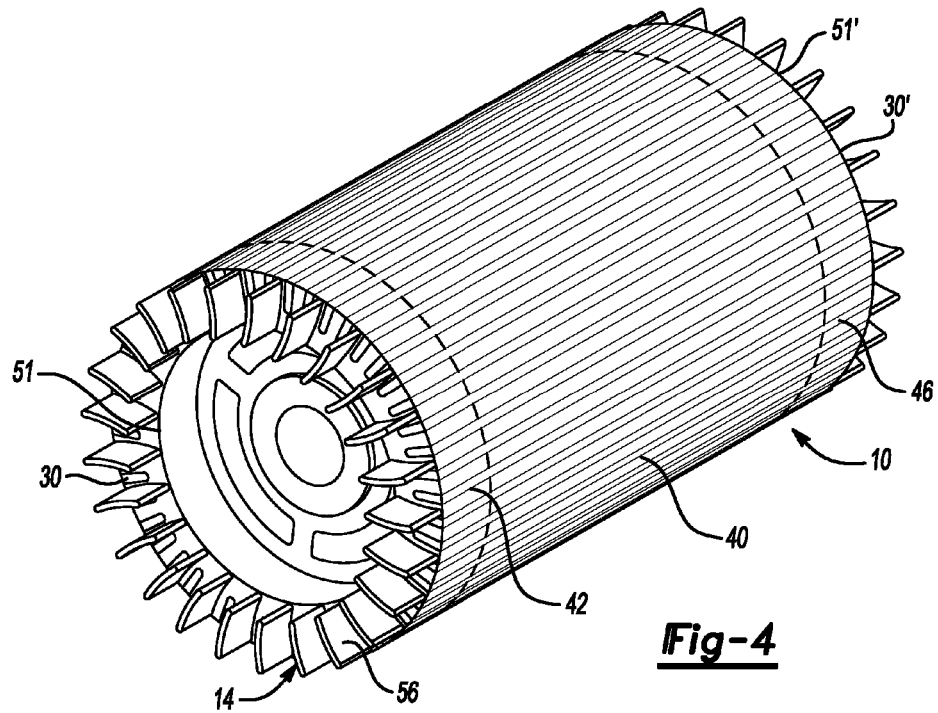
FIG. 4 illustrates a rotor assembly with finished castings of shorting end rings that includes a plurality of cast-in heat sinks, in accordance with an example of the present disclosure.

Heat may be generated in the induction motor during operation. Heat may be transferred away from the induction motor according to a number of methods. A liquid coolant may be used to cool the motor. In an example of the present disclosure, air may be used to cool the motor. FIG. 4 illustrates a rotor assembly 10 with finished castings of shorting end rings 30, 30' that include a plurality of cast-in heat sinks 56. The heat sinks 56 may be used in air-cooled motors and may be extensions of the end rings 30, 30' repeated evenly around the circumference of the end surface 51, 51' of the shorting end rings 30, 30'. The heat sinks 56 transfer heat generated by a spinning rotor assembly 10 from the shorting end rings 30, 30' to each of the plurality of heat sinks 56. The heat sinks 56 provide additional surface area to transfer absorbed heat to passing air as the rotor assembly 10 spins. As such, the heat sinks may be fins as well as impellers to cause movement of cooling air. The heat sinks 56 may be located on one or both of the shorting end rings 30, 30'. The heat sinks 56 may be directly cast in place when a net-zero die cast process is used. The heat sinks 56 may be machined when overcasting of material is used.

Unintended separation of the shorting end rings 30, 30' from the conductor bars 40 is substantially prevented by both the mechanical interlock 52 and the metallurgical bond between the shorting end rings 30, 30' and the conductor bars 40. The combination of the mechanical interlock 52 and the metallurgical bond create a total bond. The strength of the total bond is pre-determined to avoid separation of the shorting end rings 30, 30' from the conductor bars 40 as the inertial forces increase at high motor speeds.

The disclosed method to cast a shorting end ring 30, 30' onto a rotor 20 may be used on one or both ends of the rotor 20.

In examples of the present disclosure, the first flux material 32 for overcasting aluminum over copper may include $CsAlF_4$ (Cesium tetra-fluoroaluminate), CsAlF-complex, $K_{1-3}AlF_{4-6}$ (potassium fluoroaluminates) or other flux materials. The first flux material 32 may be in form of powder or paste that may be applied by dipping in a reservoir containing the first flux material 32, by using a spray gun, brush or by any other method.

In examples of the present disclosure, the second flux material 34 for overcasting aluminum over steel may include a mixture of potassium tetra-fluoroaluminate ($KAlF_4$), and also contains potassium penta-fluoroaluminate ($K_2AlF_5$). $K_2AlF_5$ exists in different modifications: potassium penta-fluoroaluminate hydrate ($K_2AlF_5.H_2O$), and hydrate-free ($K_2AlF_5$).

It is to be understood use of the words "a" and "an" and other singular referents may include plural as well, both in the specification and claims, unless the context clearly indicates otherwise.

Further, it is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Yet further, it is to be understood that the ranges provided herein include the stated range and any value or sub-range within the stated range. For example, a range from about 0.25 mm to about 0.51 mm should be interpreted to include not only the explicitly recited limits of about 0.25 mm to about 0.51 mm, but also to include individual values, such as 0.25 mm, 0.30 mm, 0.33 mm, etc., and sub-ranges, such as from about 0.28 mm to about 0.45 mm, from about 0.30 mm to about 0.40 mm, etc. Furthermore, when "about" is utilized to describe a value, this is meant to encompass minor variations (up to +/−10%) from the stated value.

While several examples have been described in detail, it will be apparent to those skilled in the art that the disclosed examples may be modified. Therefore, the foregoing description is to be considered non-limiting.

The invention claimed is:

1. A method for fabricating a rotor for an induction motor, comprising:
   disposing a first flux material on a plurality of first exposed ends of a respective plurality of conductor bars of a rotor core;
   disposing a second flux material on a first end face of the rotor core; and
   casting a first portion of a conductive material over the plurality of first exposed ends and the first end face, wherein a first portion of molten material that ultimately solidifies to form a first shorting end ring engulfs the first exposed ends with the first flux material disposed thereon and directly contacts the first end face with the second flux material disposed thereon to solidify and form the first shorting end ring to electrically and mechanically connect the plurality of conductor bars, wherein the first flux material and the second flux material are in a liquid, powder or paste form to remove oxides.

2. The method as defined in claim 1 wherein each of the plurality of conductor bars has a respective plurality of second exposed ends distal to the first exposed ends, and wherein the method further comprises:
   disposing the first flux material on the second exposed ends of the respective plurality of conductor bars of the rotor core;
   disposing the second flux material on a second end face of the rotor core; and
   casting a second portion of the conductive material over the second exposed ends and the second end face, wherein a second portion of molten material that ultimately solidifies to form a second shorting end ring engulfs the second exposed ends with the first flux material disposed thereon and directly contacts the second end face with the second flux material disposed thereon to form the second shorting end ring to electrically and mechanically connect the plurality of conductor bars, wherein the first flux material and the second flux material are in a liquid, powder or paste form to remove oxides.

3. The method as defined in claim 2 wherein each of the plurality of conductor bars comprises an aperture defined in at least one of the first exposed end and the second exposed end of each of the plurality of conductor bars.

4. The method as defined in claim 1 wherein the first flux material and the second flux material are substantially a same flux material.

5. The method as defined in claim 4, wherein the same flux material is disposed on the plurality of first exposed ends and the first end face of the rotor core after the plurality of conductor bars is inserted into the rotor core.

6. The method as defined in claim 5 wherein the same flux material is disposed on the plurality of first exposed ends and the first end face of the rotor core by dipping the rotor core into a reservoir of the same flux material in a liquid or charged powder form.

7. The method as defined in claim 5 wherein the same flux material is disposed on the plurality of first exposed ends and the first end face of the rotor core by spraying or by an other surface deposition technique.

8. The method as defined in claim 1 wherein the first flux material is disposed on the plurality of first exposed ends before the respective plurality of conductor bars is inserted into the rotor core.

9. The method as defined in claim 8, further comprising disposing the first flux material on a central portion of each of the plurality of conductor bars adjacent to the respective plurality of first exposed ends.

10. The method as defined in claim 1 wherein each of the plurality of conductor bars comprises copper or a copper-based alloy.

11. The method as defined in claim 1 wherein the rotor core includes a laminate stack of steel plates, and the first end face comprises steel.

12. The method as defined in claim 1 wherein the conductive material comprises aluminum or an aluminum-based alloy.

13. The method as defined in claim 1 wherein the first flux material is chosen from: cesium tetra-fluoroaluminate ($CsAlF_4$); a CsAlF-complex; and potassium fluoroaluminates ($K_{1-3}AlF_{4-6}$).

14. The method as defined in claim 1 wherein the second flux material comprises a mixture of potassium tetra-fluoroaluminate ($KAlF_4$) and potassium penta-fluoroaluminate ($K_2AlF_5$).

15. The method as defined in claim 14 wherein the $K_2AlF_5$ is hydrate-free or is in the form of potassium penta-fluoroaluminate hydrate ($K_2AlF_5.H_2O$).

16. A method for fabricating a rotor for an induction motor, comprising:
  disposing a first flux material on a plurality of first exposed ends of a respective plurality of conductor bars of a rotor core;
  disposing a second flux material on a first end face of the rotor core; and
  casting a first portion of a conductive material over the plurality of first exposed ends to form a first shorting end ring to electrically and mechanically connect the plurality of conductor bars wherein:
    the first flux material and the second flux material are substantially a same flux material; and
    the same flux material is disposed on the plurality of first exposed ends and the first end face of the rotor core after the plurality of conductor bars is inserted into the rotor core.

17. The method as defined in claim 16 wherein the same flux material is disposed on the plurality of first exposed ends and the first end face of the rotor core by dipping the rotor core into a reservoir of the same flux material in a liquid or charged powder form.

18. The method as defined in claim 16 wherein the same flux material is disposed on the plurality of first exposed ends and the first end face of the rotor core by spraying or by an other surface deposition technique.

* * * * *